INVENTOR.
CLAUDE M. HATHAWAY
BY
Richard W. Harris
ATTORNEY

INVENTOR.

BY CLAUDE M. HATHAWAY

ATTORNEY

INVENTOR.
CLAUDE M. HATHAWAY
BY Richard W. Hanson
ATTORNEY

Jan. 19, 1965 C. M. HATHAWAY 3,166,375

OSCILLOGRAPHIC FAULT RECORDER

Filed June 20, 1963 7 Sheets-Sheet 4

INVENTOR
CLAUDE M. HATHAWAY

BY

ATTORNEY

OSCILLOGRAPHIC FAULT RECORDER

Filed June 20, 1963 7 Sheets-Sheet 5

INVENTOR.
CLAUDE M. HATHAWAY
BY
Richard [signature]
ATTORNEY

OSCILLOGRAPHIC FAULT RECORDER

Filed June 20, 1963

INVENTOR.
CLAUDE M. HATHAWAY
BY
Richard W. Hanes
ATTORNEY

INVENTOR.
CLAUDE M. HATHAWAY
BY
Richard W. Hanson
ATTORNEY 3,166,375
Patented Jan. 19, 1965

3,166,375

OSCILLOGRAPHIC FAULT RECORDER

Claude M. Hathaway, Colorado Springs, Colo., assignor to Western Electrodynamics, Inc., a corporation of Colorado Filed June 20, 1963, Ser. No. 293,557
5 Claims. (Cl. 346—109)

The present invention relates to transient recording oscillographs and more particularly to an improved combination of oscillographic apparatus of the type whose operation is initiated by the phenomenon to be recorded.

Electric power companies have for some time recognized the value of being able to analyze recorded transients and abnormal disturbances which may have occurred in electric power circuits prior to a fault or failure therein. Since it is impractical to provide a continuous oscillograph record of the important variables in power station operation there have been developed recording devices which are inoperative until the appearance of the subject matter of which it is desired to have a record. My previously issued United States patents, Numbers 1,913,200 and 2,539,832, are exemplary of the type of device which has been in use to provide such a service. As pointed out in the written specification of Patent No. 2,539,832, the purpose and intended function of this type of instrument is to provide a recorder which can become fully operational in the least possible time in order that the faulty operation of the power station may be recorded from its inception, if possible. However, the initiating mechanisms of the prior art which act solely on the record carrier to bring it quickly up to full speed have not completely solved the problem of obtaining a complete record of the transient. In addition to that, the prior art recorders are capable of only a "one shot" operation, that is to say until the initiating mechanism has been reset the recorders are incapable of responding to a second transient disturbance which might follow on the heels of the one already recorded.

With these important limitations and disadvantages of the prior art in mind, it is apparent that the primary objective of the present invention is to overcome them and provide oscillographic apparatus of the type described which will be operative for the duration of the transient or phenomenon which initiates the recorder, even to the extent of reproducing, as part of the record, a portion of the "normal" condition preceding the disturbance.

Further, it is an objective of the present invention to provide a transient recorder of the type mentioned which will be constantly in a state of readiness to commence operation, notwithstanding the fact that it may have immediately prior thereto terminated a recording cycle.

Another object of the invention is to provide faster acceleration of the record carrier past the recording points together with improved chart speed linearity.

Still another feature of the inventive apparatus is an improved initiator mechanism which has greater reliability, is economical to manufacture and maintain and by its novel combination of elements may be easily and conveniently modified to operate at different chart speeds within certain limits.

A still further advantage of the invention is the ability to maintain the source of trace producing radiation normally inoperative while at the same time providing an alternate radiation source which is immediately responsive upon the failure of the first. Such apparatus eliminates the prior art requirement for a shutter mechanism.

The oscillograph which forms the subject matter of the present invention contains many other features, advantages and improvements over the prior art, some of which will be apparent and some of which will be pointed out specifically hereinafter as the description proceeds in connection with the accompanying drawings, in which.

Figure 1:
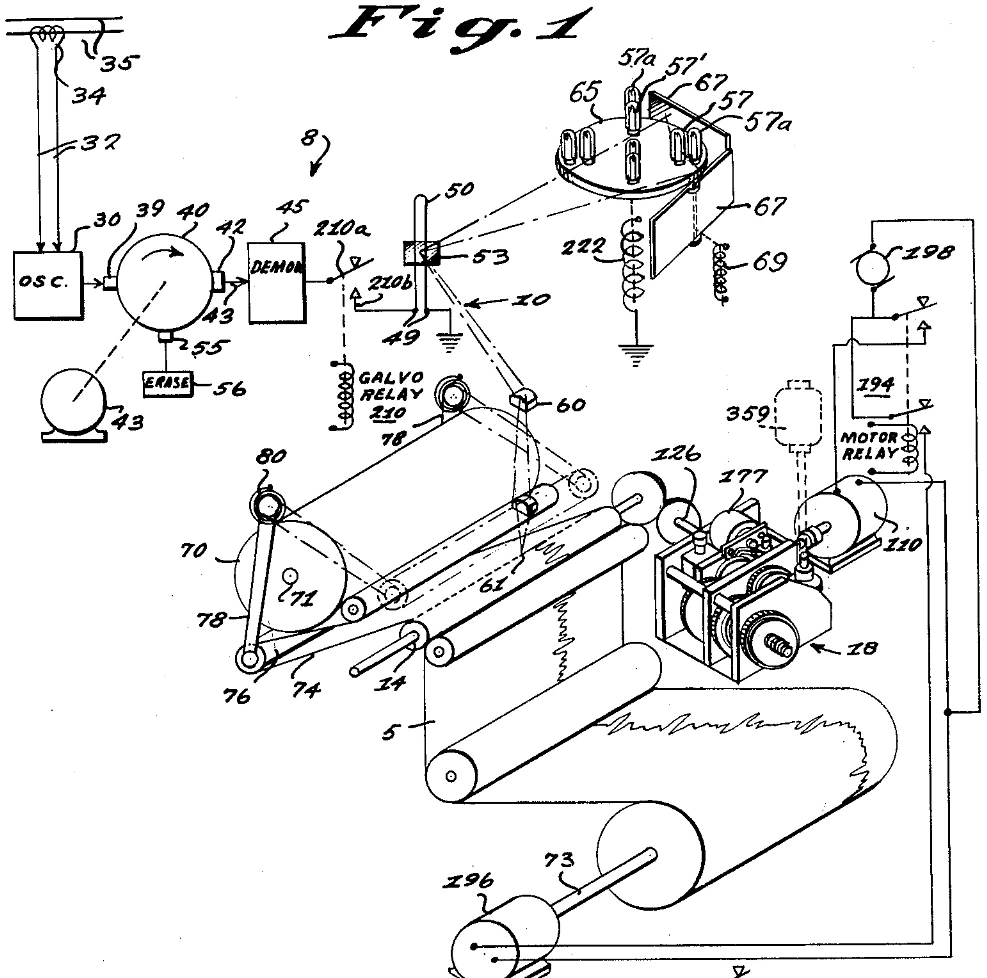
FIGURE 1 is a diagrammatic illustration of the oscillographic record of the present invention.

Generally speaking, the oscillograph comprises a means for producing a trace and a movable record carrier on which an image corresponding to the phenomena to be recorded is made by the trace producing means. The record carrier is moved lineally with respect to the trace producing means by one of two driving motors selectively connected through a clutch assembly to a drive mechanism which engages the record carrier. The trace producing means may consist of a variety of apparatus which produces one or more beams of radiation, variable according to the fluctuations of the phenomenon to be recorded.

Basically, the preferred embodiment illustrated in the drawings includes an oscillator whose frequency is controlled or modulated in accordance with the variations in some particular phenomenon to be recorded such as voltage, current, or phase relationship. The oscillator output is recorded on a rotating endless loop of magnetic recording material and "played back" at a point on the loop remote from the point of recording the data. The "play-back" output is demodulated in a frequency discriminator furnishing an output voltage as a function of the variations in the phenomenon to be recorded which is applied to the input of a moving coil galvanometer. Light from a source lamp is reflected from a first normally stationary mirror to the moving coil galvanometer mirror and thence to the record carrier where the variations in the angular position of the light beam record an image on the record carrier which may be subsequently latensified by any one of the several processing means which are not a part of the subject matter of this application.

The chart, or record carrier, upon which the image is recorded, is a medium sensitive to the radiation focused upon it by the galvanometer mirrors and lens system. The record carrier is moved at a given constant speed past a recording point, or point of focus of the radiation beam, by a drive mechanism selectively employing a high acceleration drive motor and a constant speed drive motor. Through the mechanism of a novel clutch arrangement the two motors each drive the cart transport mechanism separately but never together. The clutch automatically makes the choice of drive motors and is selective to the one having the greatest angular velocity or revolutions per unit of time.

Figure 4:
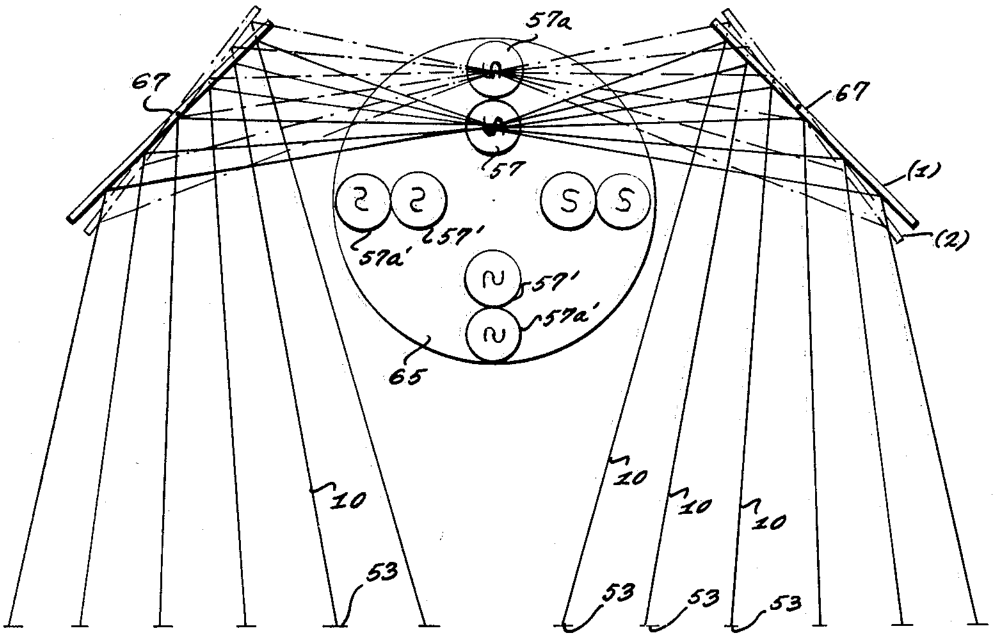
FIGURE 4 is a diagrammatic plan view of the lamp turret and cooperating pivotal reflecting mirrors which form a part of the trace producing means in the oscillographic recorder.

Several other features are incorporated in the general novel structure which will be explained subsequently in greater detail. It will be understood that the apparatus described herein is exemplary only of a single channel recorder, however practical applications of the invention incorporate a plurality of recording channels and include a galvanometer or other responsive means and the necessary input circuitry for each of those channels. In the present disclosure the explanation of one channel will be deemed to be an explanation of all channels since they are all alike, except however that the recording drum, or loop, to be hereafter referred to may be singular with a capability for multiple channel recording. The light source is also singular however it is capable of serving a multiplicity of mirror galvanometers, as is shown in FIGURE 4. It should also be noted that the scope of the invention is in no way intended to be limited to the use of galvanometers as the signal responsive device. Cathode ray tubes and other similar apparatus can be incorporated in the present combination to replace the galvanometer or to occupy other channels of the recorder to work with one or more galvanometer channels.

Referring now to the drawings for a detailed description of the fault recording oscillograph of the present invention, and first to the diagrammatic illustration of FIGURE 1 for that purpose, it will be noted that the combination of elements includes as major components a record carrier, or chart 5, trace producing means 8, including a beam of light 10, and a chart-engaging drive roller 14 operatively connected to an electro-mechanical drive mechanism 18.

Addressing the explanation to FIGURE 1 and an explanation of the trace producing apparatus, it is seen that the initial element in a typical channel is an oscillator 30, the frequency of whose output is controlled as a direct function of the electrical variations which are applied to the frequency determining input of the oscillator 30 from a line 32 which is coupled in some convenient manner to a source or line 35 whose electrical variables are being recorded. Such coupling may be made by a pickup coil 34 such as a voltage or current transformer winding, which is familiar to those skilled in the art and will therefore not be discussed further except to say that through the coil 34 and connection 32 the variations and fluctuations on the line 32 are applied to the oscillator 30 to modulate the oscillator carrier frequency of 50,000 cycles per second. The frequency modulated output of the oscillator may be amplified or applied directly to a recording head 39 positioned over one channel of the loop of magnetic recording medium 40. The loop or drum 40 is constantly rotated by a motor 43 so that a continuous record is made thereon. A magnetic pickup head 42 is mounted in playback position with respect to the same channel of the recording medium as is being recorded by the recording head 39 and the output of the head 42 is fed by an appropriate electrical connection 43 to a frequency discriminator 45. The intelligence derived by the demodulator 45, in the form of a D.C. output voltage, is in turn applied through a set of relay contacts to the terminals 49 of a galvanometer coil 50. The moving coil galvanometer is of the type having a mirror 53 attached to the two sides of its coil 50 so that rotational movements of the coil sides are reflected in corresponding movements of the mirror 53. During recording periods a filament-burning electric lamp 57 emits light 10 which is reflected to the galvanometer mirror 53 and thence to a system of optical lenses 60 to be focused on the image producing record carrier 5 at a recording point 61.

The oscillator 30, recording loop 40, and demodulator 45 operate continuously and a signal representative of a normal line function such as current in the power line 35 is always present on the wiper arm 210*a* of the galvanometer relay 210. However, until a fault or disturbing transient appears on the line being monitored and the oscillograph recording cycle is thereby initiated, the representative signal cannot pass through the de-energized relay contacts to excite the galvanometer coil 50. As will be explained in more detail later, the lamp 57 and the record carrier drive and transport means are also inoperative until the recording cycle is initiated.

One expressed objective of the apparatus of the present invention is to provide a high rate of acceleration of the record carrying chart 5 upon initiation of the cycle in order to record as much of the fault as possible, however, the mechanism obviously cannot achieve an infinite rate of acceleration and a period of approximately two milliseconds is present from the actuation of the fault responsive relays until the chart 5 has achieved normal running velocity. Though this delay in starting the record is very small, especially when recording sixty cycle per second variables, there are instances in which the most important information to be recorded lies in the first several milliseconds of the transient (such as flash-back in a mercury arc rectifier) and the failure to record that portion of the transient would greatly decrease the value of the record. There are other circumstances in which it may be analytically valuable to have recorded data relating to the condition existing immediately prior to the fault. Both of these desirable recording characteristics are provided for by the "anticipating" function of the recording loop or drum 40 and its associated recording, pickup and erase apparatus. Depending of course on the loop dimension, its rotational speed, and the circumferential separation of the record and pickup heads, 39 and 42 respectively, there may be, at any given instant, up to one or more seconds of stored data on the drum between the record head 39 and the pickup head 42. Thus when a fault occurs and the oscillograph is initiated, the final recording on the chart lags the actual occurrence a length of time represented by the amount of stored data on the drum. Through the use of such apparatus the normal running speed of the continuous drive recorder mechanism is well established by the time the fault information arrives at the galvanometer coil 50 and a record is thereby obtained which contains pre-fault information having continuity with the fault data.

Because of the possibility of radial spacing variations between the recording and playback heads and the drum 40 which would result in unwanted amplitude variations in the signal at the output of the playback head 42, the oscillator output is frequency modulated to accurately convey the signals to be recorded. The information stored on the rotating drum 40 is erased after it has passed under the pickup head 42 by an erase head 55 positioned against the periphery of the loop. Current is supplied to the erase head 55 by a source 56 so as to accomplish the erase function in a manner familiar to the art.

The filament-burning light source 57 is one of a plurality of similar sources 57′ mounted on a turnable turret 65. Each of the said light sources 57 and 57′ is paired on the turret with a secondary source 57*a* and 57*a*′ respectively. Since the light source 57 emits light only during recording periods, the burn out of the source filament will undoubtedly occur during recording periods and the second source 57*a* must be quickly available to supply the radiation to avoid lengthy interruptions in the record. Therefore, means are included in the oscillograph for detecting the failure of the primary light source 57 and switching on the secondary source 57*a* and these means will be explained subsequently in connection with the electrical circuitry of the recorder. As seen in FIGURE 4, a pair of pivotal mirrors 67 is provided adjacent the turret 65 to compensate for the change in position of the light source when the secondary lamp 57*a* takes over. The armature of an electrical solenoid 69 is mechanically connected to the mirrors 67 to pivot them from a first position (1) to a second position (2) in response to the failure of the primary light source 57, in order to maintain the same direction of reflected light to one or more galvanometer mirrors 53 as was present from the primary radiation source 57. At the end of the recording cycle during which the secondary source 57*a* was energized a solenoid connected to the turret 65 is energized to rotate the turret 65 ninety degrees and bring the next pair of light sources 57' and 57*a'* into operating position. With the four position turret shown in the drawings it is possible to incur four lamp burnouts before a change of lamps is necessary.

The record carrier 5 may be any sensitized medium which is responsive to radiation to form a latent image thereon. The record carrier supply 70 is rolled on a supply spool 71 and payed out by the pulling action of the chart engaging drive roller 14 which is geared to the drive mechanism 18. A motor driven take-up spool 73 is provided on which to wind up and store an exposed length of chart 5. Immediately following the supply roll 70 is a loop 74 supplying the chart during the initial acceleration of the record carrier and its driving mechanism. The loop is formed and kept in light tension by a loop roller 76 slung beneath the supply roll 70 by a pair of pivotally mounted cradle arms 78. The cradle arms 78 are disposed at each end of the supply roll 70 and each is biased by a spring 80 which is responsible for maintaining the loop tension and also functions to reform the chart loop after the recording cycle.

Figures 2, 15:
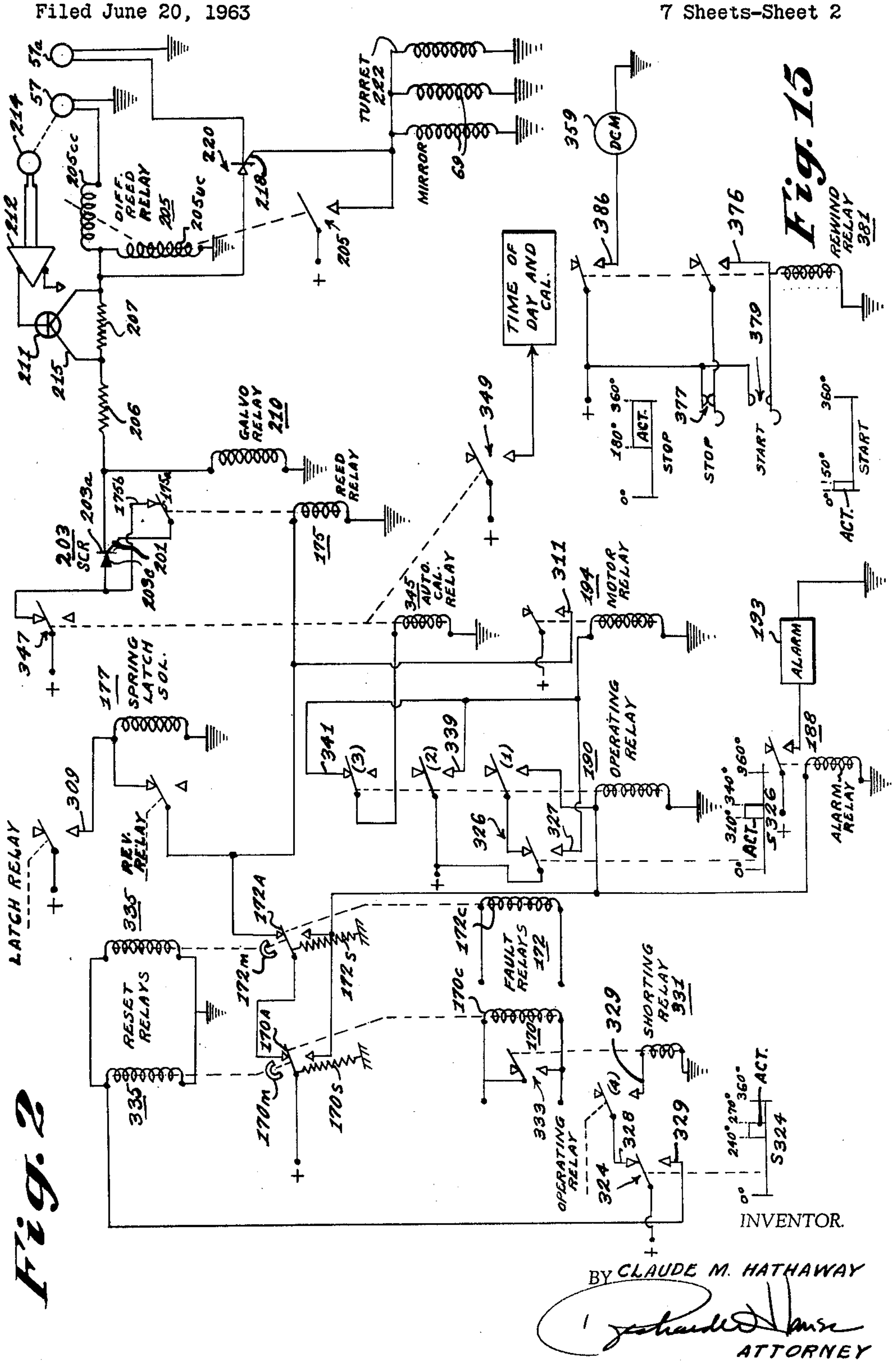
FIGURE 15 is a schematic diagram of the electrical circuitry which controls the spring motor rewind motor.
Figure 16:
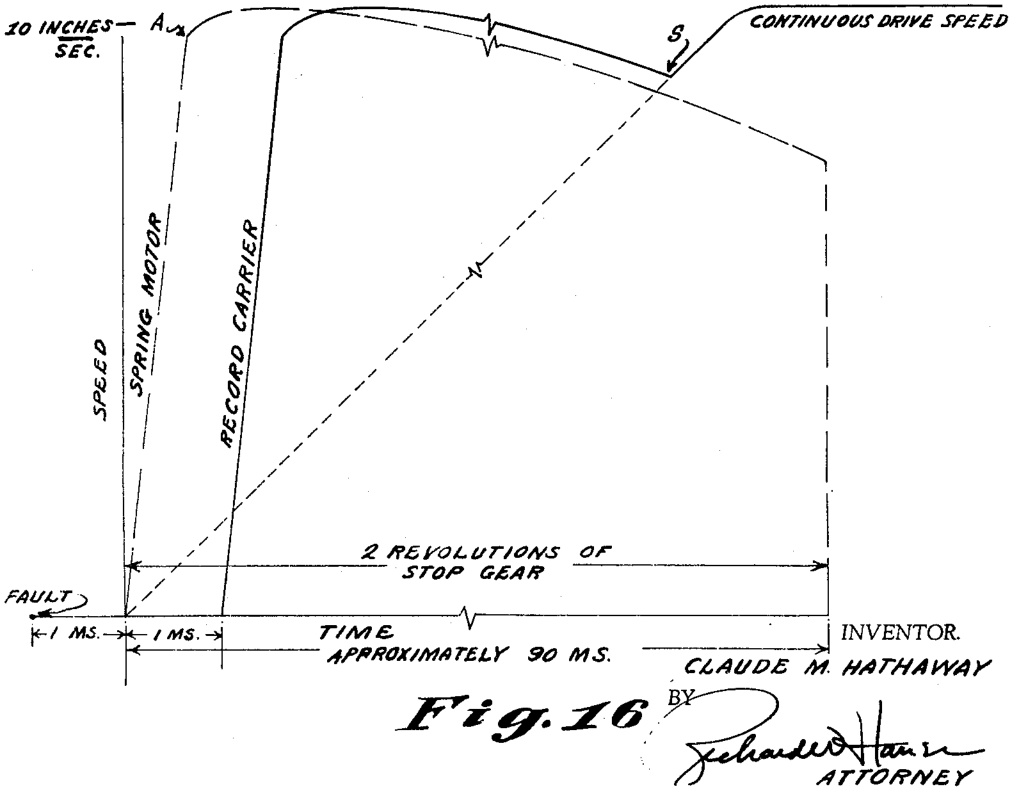
FIGURE 16 is a graphical plot of speed versus time illustrating the dynamic characteristics of the oscillographic recorder of the present invention.
Figures 8, 10, 11:
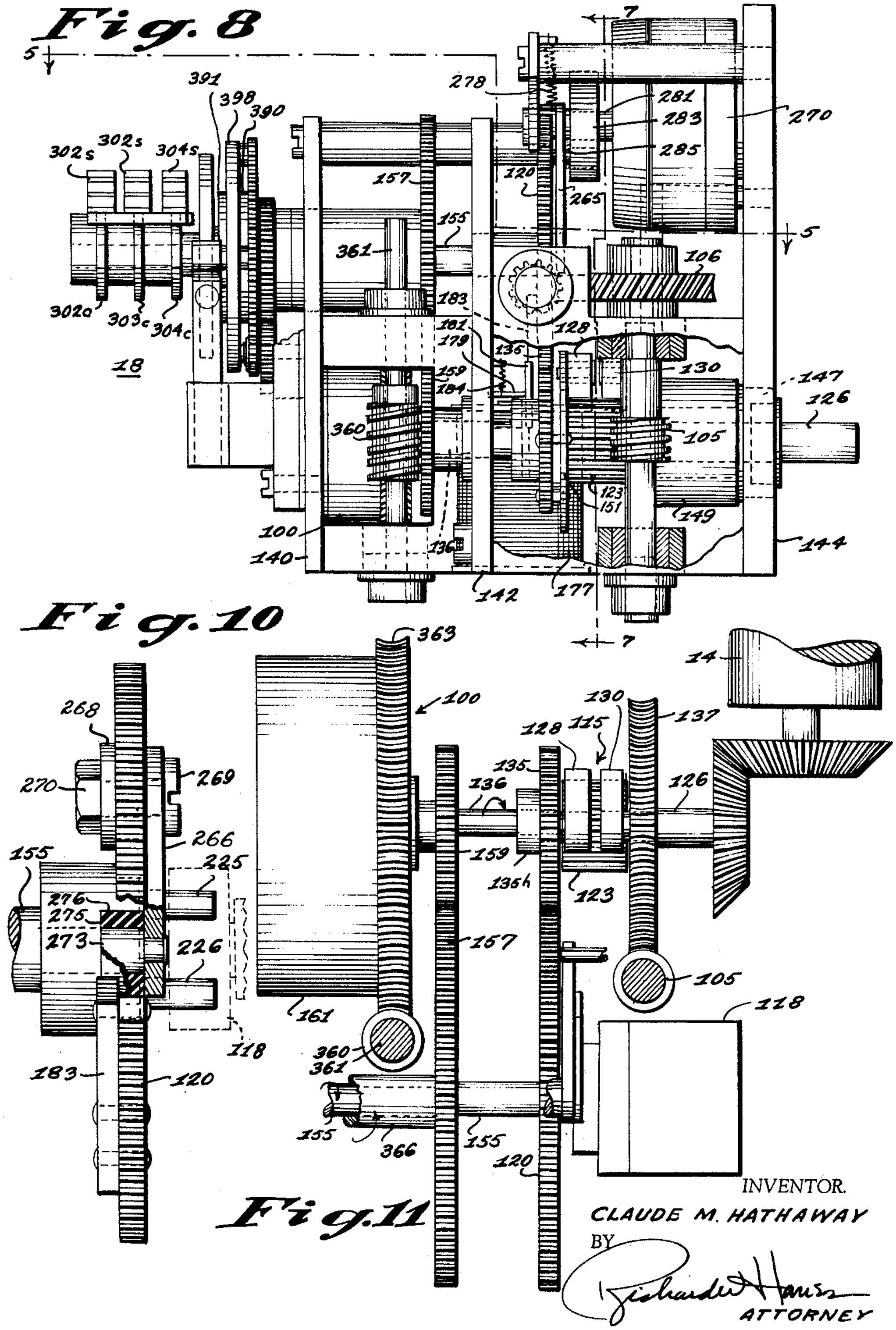
FIGURE 8 is a side elevational view of the electro-mechanical drive mechanism of the present invention having a portion broken away and shown in cross-section to more clearly illustrate the details of the mechanism.
FIGURE 10 is an enlarged elevational view of the "stop" gear with a portion thereof broken away and shown in cross-section to more clearly illustrate the details of the mounting of the "stop" bar.
FIGURE 11 is a diagrammatic representation of the electro-mechanical drive mechanism.

Many of the objectives of the present invention are accomplished by the novel drive mechanism 18 which will now be explained in connection with the operation of the electrical circuitry which turns the mechanism on and stops it. Attention is now directed to FIGURES 2, 11, and 16. A spring motor 100 is operably connected to the drive roller 14 through a positive rim drive uni-directional clutch 115, as is the continuous drive motor 110 which is connected to the shaft of worm gear 105. A speed control and damping means 118 is connected to one of the spring motor output gears 120. The speed control mechanism 118 is effective in its operation to form the knee A in the spring motor speed curve of FIGURE 16 and to substantially level the speed curve of the record carrier during the period of spring motor drive. As illustrated in the curves of FIGURE 16, the record carrier is brought up to a running speed of ten inches per second in approximately two milliseconds from the start of the fault. Approximately eighty to one hundred milliseconds later the continuous drive motor 110 has accelerated to a speed comparable to the existing spring motor drive speed and "overrides" the spring motor output, through the operation of the rim drive clutch 115, thus taking over the chart driving function while the spring motor continues to decelerate until it is arrested by appropriate mechanism to be later explained.

Figures 12, 13, 14:
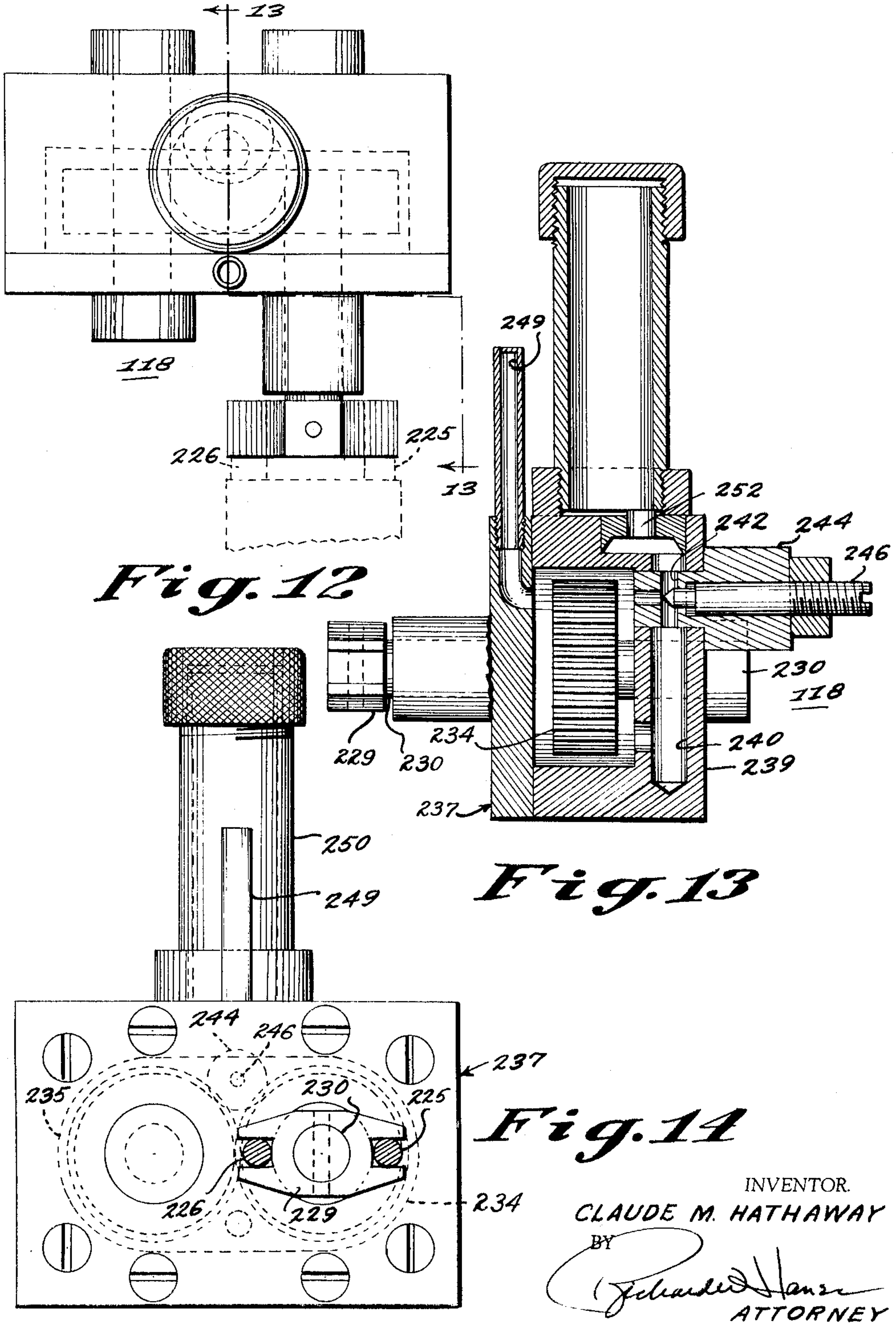
FIGURE 12 is a top plan view of the hydraulic gear pump speed control mechanism.
FIGURE 13 is a cross-sectional view of the speed control mechanism taken along lines 13—13 of FIGURE 12.
FIGURE 14 is a front elevational view of the hydraulic pump speed control mechanism.

As to speed regulation, FIGURES 12, 13, and 14 illustrate the hydraulic pump 118 of the preferred embodiment which is coupled to the gear train of the spring motor to control and regulate the otherwise sharply sloping speed curve of the spring motor.

A pair of diametrically disposed drive pins 225 and 226 projecting from the back face of the stop gear 120 are received by the two bifurcated ends of a coupling member 229 secured to the pump shaft 230 of a damping pump 118. The rotatable pump shaft 230 carries one of two intermeshed pumping gears 234 and 235 disposed within an enclosed pump housing 237. The rear wall 239 of the housing 237 is provided with a drilled passageway 240 which, together with a horizontal T-shaped hole 242 in a bushing 244, inserted in the rear wall directly above the passageway 240, forms a connecting path from the pressure side (upper side) of the pump to the "vacuum" side. By adjustment of a needle valve 246 positioned at the junction of the said T, the orifice through which the hydraulic fluid is pumped from one side of the pump to the other can be controlled. The setting of the orifice size controls the upper limit of speed of the spring motor output. Such a damping pump is highly desirable for this application because the torque required to drive the pump is directly proportional to the speed of the pump. In addition, a special cavity 249 is in communication with the pressure side of the pump to act as a "sink" for the unrestricted flow of pump fluid during acceleration of the pump and the spring motor 100. At the time when the special cavity cylinder 249 is filled with fluid and the pump must circulate its fluid through the control orifice and passageway 240, speed control is initiated. Thus, it is seen that the speed of the spring motor is controlled by the needle valve setting and the slope of the spring motor speed curve can be altered to some extent by varying the size of the cavity 249. A reservoir 250 is positioned on top of the pump housing for the storage of pump fluid with an appropriate fluid connection 252 between the reservoir and the T 242 in the bushing 244.

Figures 5, 9:
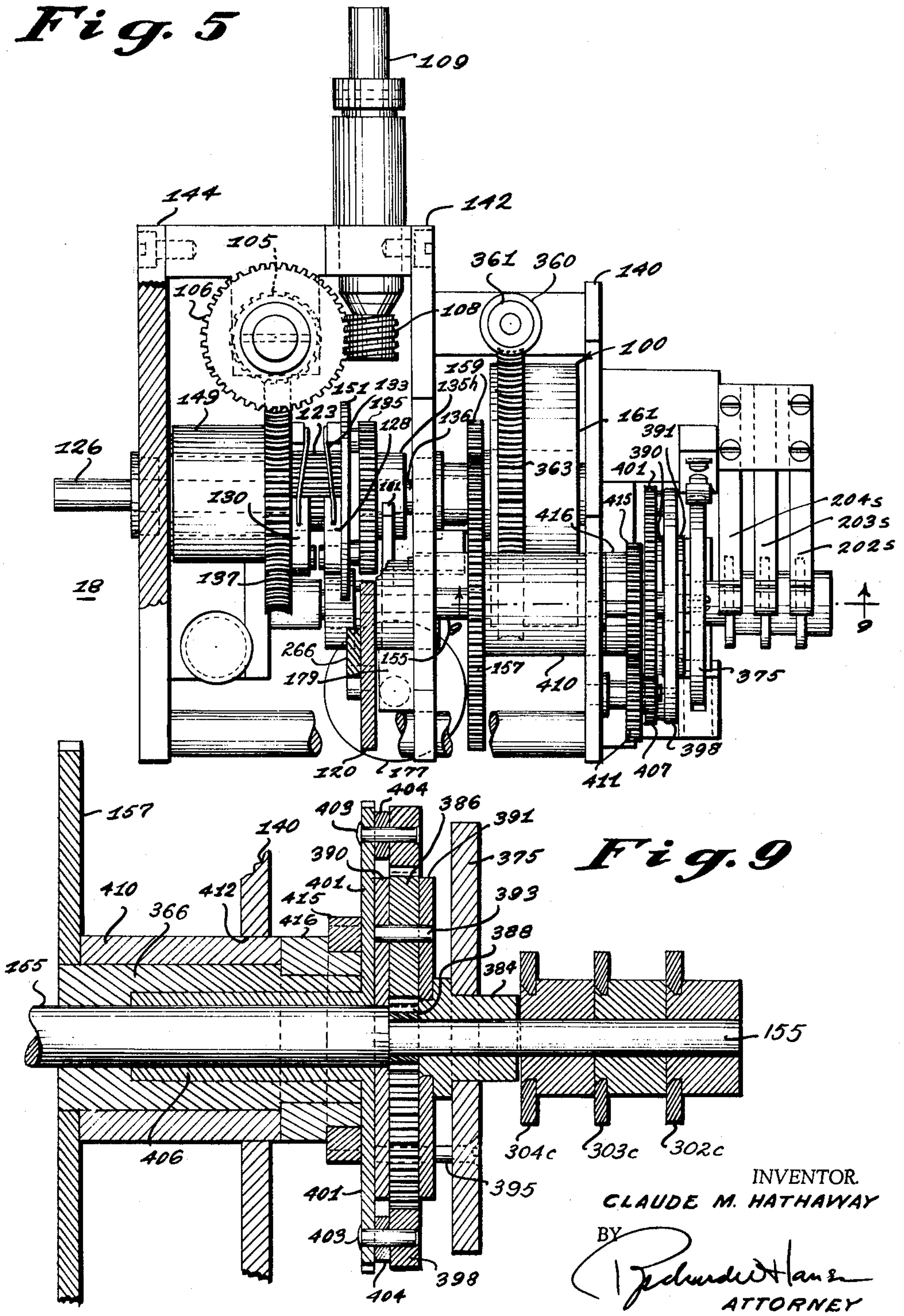
FIGURE 5 is a plan view of the electro-mechanical drive mechanism having a portion thereof, including the rotary solenoid, broken away along lines 5—5 of FIGURE 8 to more clearly illustrate the mechanism and gearing in the lower portion thereof.
FIGURE 9 is an enlarged fragmentary cross-sectional view showing a portion of the electro-mechanical drive mechanism taken along lines 9—9 in FIGURE 5.

The clutch mechanism itself comprises a driven member, preferably a ratchet gear 123, which is concentrically mounted on the main chart drive shaft 126 for rotation therewith. The ratchet gear 123 is rotatably driven by one of two independently mounted driving dogs 128 and 130 whose teeth are pressed against the rim teeth of the ratchet gear 123 by appropriate biasing springs 131 and 133 (FIGURES 5 and 8). One of the driving dogs 128 is pivotally mounted at the side of a spur gear 135 carried by the output shaft 136 of the spring motor 100, both of which are co-axial with the ratchet gear 123. Actually, and as shown in all figures save the "functional" diagram of gearing of FIGURE 11, the driving dog 128 is pivotally mounted on a circular drive plate 151 parallel with and secured to the spring motor output gear 135. The second driving dog 130 is similarly attached to the side of a helical drive motor output gear 137, mounted concentrically with the chart drive shaft 126, but rotatable with respect thereto.

Figure 6:
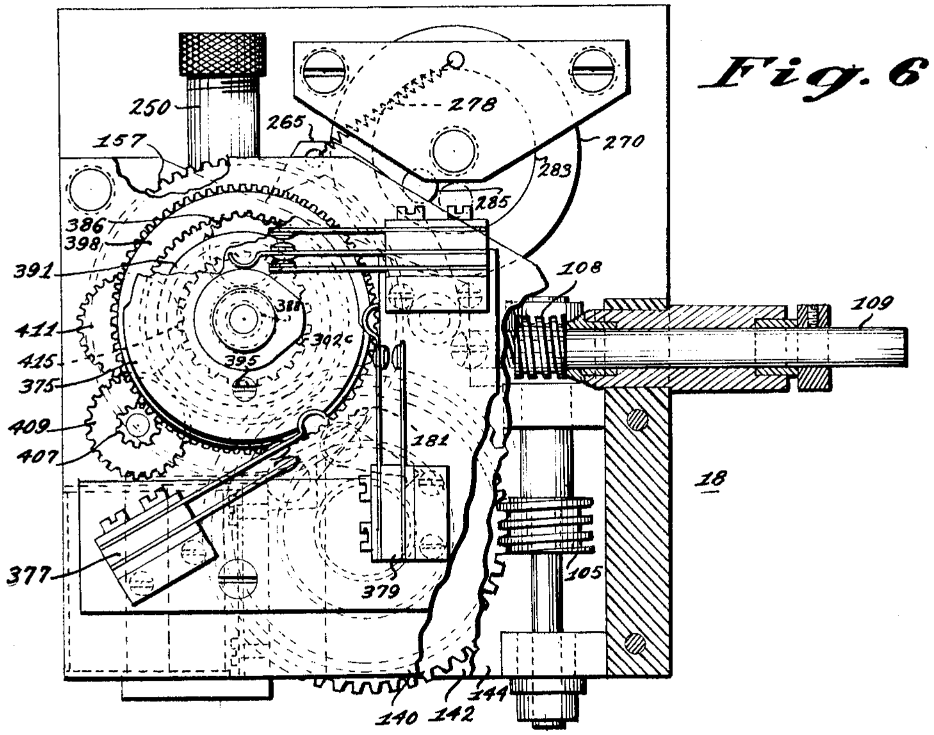
FIGURE 6 is a front elevational view of the electro-mechanical drive mechanism with portions broken away and shown in section to more clearly illustrate the details of the unit.
Figure 7:
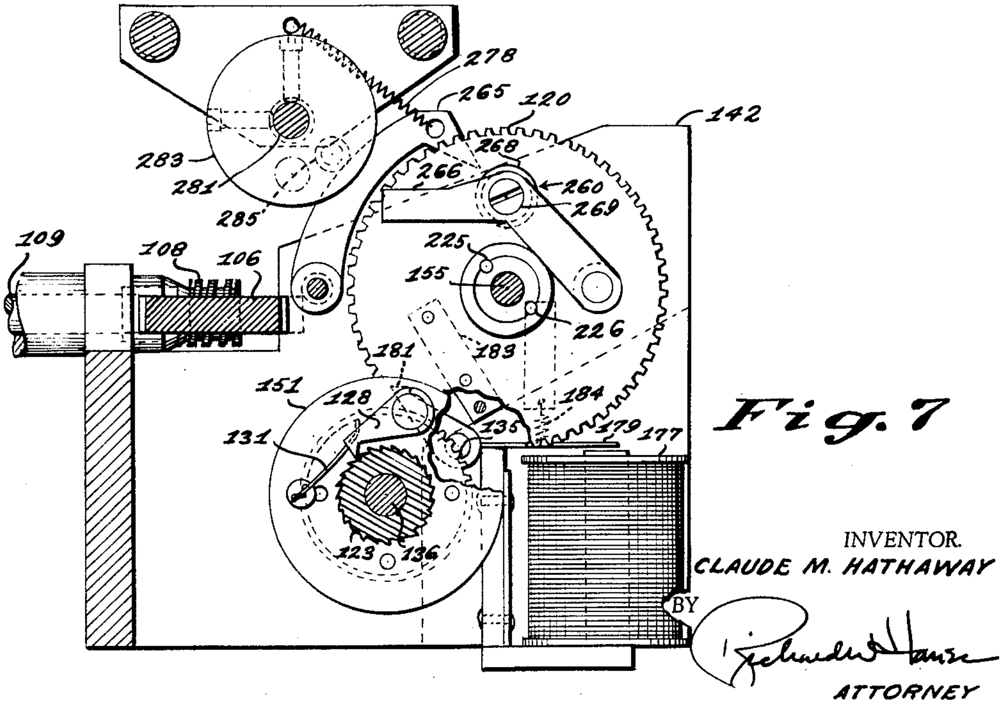
FIGURE 7 is a cross-sectional view of the electro-mechanical drive mechanism taken along lines 7—7 in FIGURE 8.

As seen best in FIGURES 6 and 8, the drive motor output gear 137 is turned by the drive motor 110 through a series of gears and drive shafts including the worm gear 105, an intermediate helical gear 106 rotatable with and mounted on the shaft of the worm gear 105, and a second worm gear 108 which meshes with the intermediate helical gear 106 and whose integral shaft 109 is coupled to the output shaft of the continuous drive motor 110. Referring now to FIGURE 7, it is seen that the tooth of the driving dog 128 engages the periphery of the ratchet gear 123 and as the output gear 135 is turned clockwise by the spring motor shaft 136 the ratchet gear is also turned in the same direction. Initially, while the continuous drive motor is accelerating to running speed the second driving dog 130 slips over the peripheral teeth of the ratchet gear 123 because of the higher relative speed of the spring motor driven ratchet gear. However, at point S on the speed curve of FIGURE 16, the drive motor output gear 137 has attained sufficient speed and overtakes the spring motor output gear 135 allowing the second dog 130 to take over the driving function of the ratchet gear and drive shaft while the first operating driving dog 128 slips over the teeth of the ratchet gear 123.

The structure of the drive mechanism 18 includes parallel front, center, and rear plates 140, 142, and 144 respectively which mount the various elements of the drive mechanism including the previously described clutch 115. The main output drive shaft 126 is supported by two spaced apart ball bearings (not shown) which are held by a bearing stud 147 press fitted into an aperture in the rear mounting plate 144. The continuous drive motor output gear 137 and its hub member 149 are also mounted for rotation on the bearing stud 147 through the center of which passes the drive shaft 126. The output shaft 136 from the spring motor 100 passes through the center place 142 and is journaled in a bearing member within the aperture in the plate. Also carried by the output shaft 136 is a spring barrel gear 159 whose hub 160 is attached to the barrel or housing 161 of the spring motor for rotation with the barrel independently of the output shaft rotation. The function of the barrel gear 159 and the spur gear 157 with which it is engaged will become apparent subsequently in the section of the specification disclosing the spring rewind mechanism. In meshing engagement with the spring motor output gear 135 is a larger diameter "stop gear" 120 fixed to one end of a "sensing" shaft 155 extending forwardly through bearings in the center and front plates 142 and 140. The sensing shaft 155 is coaxial with the spur gear 157 which meshes with the barrel gear 159, but neither the spur gear nor its hub are attached to the shaft 155 and they rotate independently thereof.

With the aid of the electrical diagrams of FIGURES 1 and 2, the starting and stopping sequences of the drive mechanism 18 can now be explained. The recording cycle is started by the actuation of one of several fault relays (only two are shown in FIGURE 2). Each of these several fault relays is responsive to a different fault condition, such as over-voltage, under-voltage, over-current, negative-phase sequence current, etc. The coils **170*c* and 172*c* of the two fault relays shown are appropriately connected to the power line which is being monitored by the recorder. Each of the relays is mechanical and comprise a light steel wiper arm 170A and 172A that moves only a fraction of one-thousandth of an inch under the influence of its coil field to break the normally closed contact of the relay and interrupt the continuity of a series electrical connection which includes a source of voltage, all of the fault relay normally closed contacts, and a parallel combination of a reed relay 175 and spring latch solenoid 177. The breaking of this series connection by any one of the fault relays causes the reed relay 175 and the spring latch solenoid 177 to be de-energized. De-energizing the reed relay 175 initiates the galvanometer circuitry and radiation sources while the de-energizing of the spring latch solenoid 177 allows the spring motor 100 to start running. The fault relays are all high speed positive acting devices and include permanent magnets 170*m* and 172*m* which firmly maintain the armatures in their normally closed positions until the magnetic attraction of the operating coils 170C and 172C exceeds the attraction of the permanent magnets. Once an incremental movement is made by the armature of one of the relays the reluctance of its permanent magnet flux path increases sharply and the armature is moved with great speed by the large differential magnetic force acting upon it and the assisting force of a small tension spring 170*s* and 172*s***.

FIGURES 7 and 5 illustrate the spring latch solenoid 177 whose armature 179 and integral trigger 181 are pivotally mounted on the center mounting plate 142 in juxtaposition to the solenoid coil. A latch forming bar 183 riveted to the front facing side of the stop gear 120 co-acts with the holding trigger 18 to keep the spring motor from running. Assuming that the spring motor 100 is wound, the spring motor gear train will start to move when the tension of the biasing spring 184 pulls the armature 179 upwardly away from the de-energized coil of the spring latch solenoid 177 thus rotating the holding trigger 181 counter-clockwise (referring to FIGURE 7) and out of the way of the latch bar 183. Having removed the obstruction (trigger 181) the stop gear is free to rotate from the torque of the spring motor and in so doing turns the output gear 135 and the driving dog 128 which causes the ratchet 123 and the output shaft 126 to rotate.

When the armature 170A or 172A reaches the normally open contact of the energized fault relay the D.C. voltage on the armature is applied to the coil of an alarm relay 188 and the coil of an operating relay 190. Energizing the former will cause an audio or visual alarm 193 to act and alert operating personnel to the fault. By energizing the operating relay 190 voltage is applied through the contacts (2) of that relay to the coil of the motor relay 194, whose contacts, when actuated, connect the continuous drive motor 110 and the take-up spool drivem otor 196 each to a source 198 of voltage (see FIGURE 1).

To complete the explanation of the starting function attention is directed to the reed relay 175 whose contacts **175*a* and 175*b* close when the relay is de-energized at the initiation of the cycle. The closing of the reed relay contacts effectively applies a D.C. voltage to the control electrode 201 of a silicon controlled rectifier (SCR) 203. The application of the voltage to the control electrode 201 of the SCR causes the rectifier to "fire" or conduct, thus passing the voltage applied to its cathode 203*c* to its anode 203*a* and along a connecting electrical path to the voltage and current coils of a differentially wound reed relay 205. One side of the filament of the primary radiation source, the lamp 57, is connected to one end of the current coil 205*cc* of the reed relay and, assuming the filament has continuity to electrical ground, current will flow therethrough illuminating the lamp. Also connected to the anode 203*a* of the SCR 203 is the coil of the galvanometer relay 210, which, when voltage is applied thereto, closes the contacts 210*a* and 210*b* of the galvanometer relay, making the galvanometer coil 50** responsive to the electrical phenomena to be recorded.

Oscillographs of the prior art have employed some form of mechanical shutter to selectively apply light to the recording medium, since the light source is energized at all times. However, the apparatus of the present invention includes, in lieu of a shutter, a system of light feedback to effect a decrease in an initially high voltage impulse to the light source which causes the lamp to emit full brilliance in a time comparable to or shorter than the operation of a mechanical shutter. The diagram of FIGURE 2 shows that two resistors 206 and 207 are connected in series with the SCR anode **203*a* and the lamp filament. A shorting connection is made across one of the series resistors 207 by a transistor 211. The transistor is biased normally ON by the output of an amplifier 212 so that the resistor 207 is normally shorted out of the circuit. The feedback amplifier input is supplied by a photocell 214 or similar light sensitive which is positioned to receive the light from the lamps 57 or 57*a* mounted on the turret 65. At the time the SCR 203 "fires" 55 a D.C. voltage in excess of the normal operating requirement of the primary lamp 57 is impressed across its filament, bringing the lamp to full brilliance much more rapidly than would ordinarily be the case. When full brilliance is detected by the photocell and a sufficient feedback voltage is present on the biasing element of the transistor 211, the conduction of the transistor ceases, removing the short 215 from around the resistor 207**. Once the short is removed and lamp current is flowing through the resistor a decrease to normal voltage is felt on the lamp filament.

Upon burn-out of the primary lamp filament 57 current flows through neither the filament nor the current coil **205*cc* of the differentially wound relay 205. Howevery, since voltage is still present across the voltage coil 205*vc* of the relay, the contacts 205*x* are made to close, thereby applying voltage to the control electrode 218 of a second SCR 220. In a manner similar to that explained for the first SCR 203, the second SCR 220** is made to conduct, thus applying voltage to the filament of the secondary lamp 57*a*. At the time of burn-out of the primary lamp 57 the feedback voltage to the transistor also disappeared causing the resistor 207 to again become short circuited. Hence the secondary lamp 57*a* is energized in the same manner as is the first lamp 57. Connected to the control electrode 218 of SCR 220 are a pair of mirror solenoids 69 which are activated to reposition the reflective mirrors 67 when the alternate lamp source is activated as previously explained.

In electrical parallel with the mirror solenoids 69 is a turret indexing solenoid 222 which, when energized cocks a mechanical indexing apparatus (not shown) in such a fashion that when the recording cycle is completed and the voltage is removed from the turret solenoid 222, an indexing motion of the turret will take place and the turret will actually rotate the given number of degrees required to position the next set of lamps.

It is apparent that the length of time required for the continuous drive motor to accelerate to a speed sufficient to "override" the output of the spring motor will vary as a function of the desired chart speed. However, for a selected chart speed such as ten inches per second and with a given spring motor, the continuous drive motor will have achieved its running speed by the end of a given number of revolutions of the spring motor which may be predetermined and which will be the same for all starts. This factor results in simplification of means to stop the spring motor where braking is initiated after a given number of revolutions rather than in response to the actual override by the continuous drive motor. The objective of the braking system of the preferred embodiment is to arrest, with relatively heavy and rugged means, one of the gears in the spring motor output train and then transfer the holding function to a more delicate and light weight latching means which can be released quickly when the recorder is started again. In the preferred emobdiment to be explained switching means actuate mechanical braking elements which arrest the stop gear 120 at the end of two revolutions of that gear. However, by merely attaching "jumper" wires to certain of the relays and wiring points, as indicated by dotted lines in the circuit diagram of FIGURE 2, the system is easily converted to stop at the conclusion of one revolution of the stop gear 120.

Figure 3:
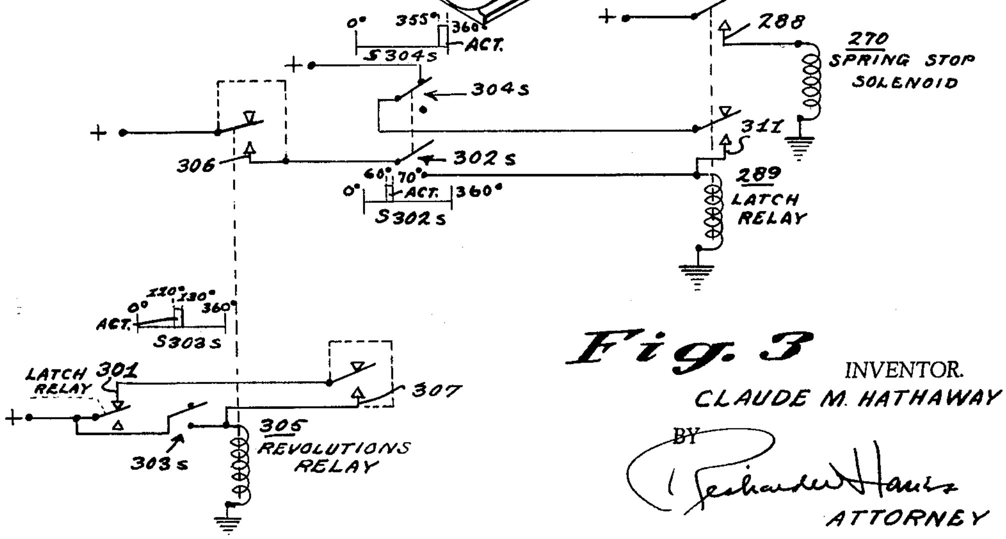
FIGURE 2 and 3 are functional schematic diagrams showing a portion of the electrical control circuitry of the oscillographic recorder.

For a discussion of the spring motor braking elements and their operation reference is made especially to FIGURES 3, 7, and 10. The essential elements of the braking device itself include a stop bar assembly 260 secured to the back face of the stop gear 120, a stop hook 265 adapted to engage the stop bar 266, and a rotary solenoid 270 whose output shaft 281 has mounted thereon a disk 283 having an eccentric stud 285 protruding therefrom to engage the back of the stop hook 265. The stop bar is pivotally mounted at its center on a bushing 268 pressed through an aperture in the stop gear 120 and is held in place by a screw 269 and hex nut 270. One end of the stop bar is substantially fixed to the gear 120 by a stud 273 extending into a cylindrical shock absorbing rubber grommet 275 received and held in a second aperture 276 in the stop gear 120. In addition to the actual braking elements the combination includes the latching means which comprises the spring latch solenoid 177, the pivotal solenoid armature 179 and holding trigger 181, all of which have been previously referred to in connection with the description of the starting sequence of the recorder. The electrical operation of the braking and holding elements is based in part on three cam operated switches 302*s*, 303*s*, and 304*s* respectively positioned in sliding engagement with three cams 302*c*, 303*c*, and 304*c* which are mounted on and rotate with the sensing shaft 155. These cams are schematically illustrated in FIGURE 3 in their normally open or unactuated position and are shown with an accompanying schedule S302*s*, S303*s*, and S304*s* depicting, by raised blocks above a horizontal line, when, during the 360 degrees of sensing shaft rotation, the respective switch is "actuated" or closed.

Following the starting of the spring motor by the deactuation of the spring latch solenoid 177 and at approximately 60° of sensing shaft rotation the first cam switch 302*s* is momentarily actuated and its normally open contacts are closed. No electrical effect is produced however, because the switch contacts are in series with one of the normally open contacts 304 of the revolutions relay 305. Subsequently and at approximately 120° of sensing shaft rotation a second cam switch 303*s* is actuated briefly and voltage is applied through its closed contacts to energize the revolutions relay 305. Although the cam switch 303*s* stays closed for only a few degrees of shaft rotation, the revolutions relay is held in an energized position by voltage applied to its coil through the normally closed side 301 of one set of contacts on the latch relay 289 and a set of holding contacts on the revolutions relay itself. During the second revolution of the sensing shaft, or at about 420° of total rotation, the first cam switch 302*s* again closes its contacts and voltage is thereby applied through the normally open side 306 of the now actuated revolutions relay to the coil winding of the latch relay 289. As the latch relay 289 is energized the holding voltage on the revolutions relay is interrupted and the revolutions relay 305 is de-energized, its revolutions "counting" function having been completed. Once energized, the latch relay 289 is held by voltage applied through the normally closed contact of the third cam switch 304*s* and the relay's own holding contact 311. By reference to the schematic illustration of the latch relay contacts in FIGURES 2 and 3 it is seen that when the latch relay is energized at 420° of shaft rotation voltage is applied through its normally open contact 309 to the spring latch solenoid 177 in order to re-position the holding trigger 181 and voltage is simultaneously applied through another one of the relay's normally open contacts 288 to the spring stop solenoid 270. Upon actuation of the spring stop solenoid 270 the solenoid shaft 281 and stud mounting disk 283 rotate approximately 30° and thereby force the stud engaging stop hook 265 into position for meeting the stop bar 266. The impact of the stop bar and stop hook is absorbed by the resilient compression of the stop bar mounting grommet 265. The third cam 304*c* is so arranged with respect to the stop gear and the attached stop bar 266 that the normally open contacts of the cam switch 304*s* close substantially simultaneously with the engagement of the stop bar by the stop hook, thereby opening the holding circuit to the latch relay 289 which in turn causes the spring stop solenoid 270 to be de-energized because its current path through the normally open contact 288 of the now de-energized latch relay is broken. When the voltage is removed from the spring stop solenoid 270 spring means within the solenoid exert a torque on the solenoid shaft 281 and counter-rotate the shaft 281, disk 283, and stud 285 to their normal position, thus permitting the stop hook biasing spring 278 to withdraw the stop hook 265 from its engagement with the stop bar 266 which occurs as the continuing torque on the stop gear 120 tends to keep the gear turning slowly and slides the stop bar 266 along the inner face of the stop hook 265. Although the latch relay 289 has been de-energized, by its connection to a source of voltage through a normally closed contact on the revolution relay and a contact 311 on the energized motor relay 194 and the latching or holding trigger 181 catches against the latch bar 183 when the stop hook 265 has been fully retracted. By the steps just described the stop gear 120 and spring motor have been fully arrested and the mechanical and electrical elements are fully ready for another start at the beginning of the next recording cycle. It should be noted that the spring latch solenoid remains energized to latch the spring motor by the connection to voltage through the motor relay which remains energized until after the starting relays have been reset, and then receives its voltage from the normally closed, or reset, side of the starting relays.

Inasmuch as most faults or disturbances which are to be recorded last only a fraction of a second or longer it is only necessary in providing a record of a single fault to have a record length corresponding to two or three seconds of recording, provided means are available to automatically extend the record length if the need arises. For a chart speed of ten inches per second a "record length" is arbitrarily chosen as thirty inches, but of course can be easily changed from this figure to meet varying requirements. In order to terminate the recording at the end of a thirty inch record a "record length" cam is geared to the chart transport mechanism in such a way that the cam makes one complete revolution for each thirty lineal inches of chart which passes over the drive roller 14. Although the cam is not illustrated mechanically in the drawings the cam schedules S324 and S326 are set forth in connection with the diagrams in FIGURE 2 of the two cam switches 324 and 326 which the "record length" cam operates. The switches will be referred to as the "record length" cam switch 326 and the "reset relay" cam switch 324.

Through the normally closed contact 328 of the reset relay cam switch 324 voltage is supplied to the armature of one set of the operating relay 190 contacts (4). When the operating relay is energized as previously explained, the voltage is passed through the normally open contact 329 to the coil of a shorting relay 331. The contacts 333 of the shorting relay are heavy and are adapted to conduct large currents around the coil of a fault relay, such as the one designated by the reference numeral 170 which might well be used for detecting an over-current condition. The shorting relay is operative only after a recording cycle has been started and the operating relay has been energized. At approximately 240° of rotation of the record length cam, the cam switch 324 is activated to a position of continuity between the wiper arm and the normally open contact 329 of the switch 324 which is electrically connected to parallel connected reset relays 335 while at the same time the voltage is removed from the shorting relay coil 331 and the fault relay coil is no longer shorted out. The coils of the reset relays 335 act individually on the armatures of the fault relays, but with a force direction opposite to that exerted on the respective armatures by the fault relay coils 170, 172, etc. The coils of the reset relays 335 tend to attract the armatures back to their normal positions against the biasing force of a spring mechanically connected to the armature, as the spring 170*s*, for example. If the fault or disturbance is still present and is being felt by the coils of the fault relays the reset force exerted on the relay armatures by their reset relay coils 335 is insufficient to overcome the combined force of the biasing spring 170*s* and the fault relay coil 170 which, when energized, is exerting an oppositely directed force, and the fault relay remains unchanged. However, if the fault has disappeared and the starting relay coil is de-energized the force of the reset relay will overcome the spring force and pull the armature back into contact with the normally closed side of the relay. At approximately 270° of cam travel the reset relay cam switch 324 will be returned to its normally closed position.

At approximately 310° of cam rotation the record length cam switch 326 will be activated to close its wiper arm against the normally open switch contact 327 applying voltage directly to the already energized motor relay coil 194 and to the normally closed contact 341 of one set (3) of contacts of the operating relay 190. The actuation of the record length cam switch 326 removes voltage from the holding contacts (1) of the operating relay 190 and if voltage is no longer being supplied to the operating relay coil through one of the actuated fault relays the operating relay will be de-energized. However, if the fault is not over and the fault relay has not been "reset," voltage remains directly applied to the operating relay coil 190 and the interruption of voltage to the holding contact (1) is of no significance. In the latter case, recording is continued through another cycle and another record length without interruption. Assuming that the fault is over and the operating relay 190 is de-energized, the motor relay 194 remains energized by virtue of the voltage applied to its coil directly through the actuated record length cam switch 326. The drive and take up motors 110 and 196 continue to run until the record length cam reaches approximately 340° of rotation at which point the record length cam switch 326 is deactuated and returns to its normally closed position, thus de-energizing the motor relay 194.

During the time interval between the de-energizing of the operating relay 190 and the motor relay 194, voltage from the actuated record length cam switch 326 is applied through the normally closed contact 341 of the third set of contacts (3) of the operating relay 190 to energize the automatic calibration relay 345. The actuation of the calibration relay 345 operates a first set of contacts 347, and thereby disrupts the operating voltage applied to the galvanometer relay 210 and radiation source 57, thus terminating normal recording and clearing the record carrier for the recording thereon of a calibration reference voltage and date and time symbols which respond to voltage applied through a second set of contacts 349 on the automatic calibration relay 345. The automatic calibration relay 345 is de-energized along the motor relay 194 when the record length cam switch is returned to its deactuated position, at which time the recording cycle is terminated and the apparatus is fully ready for the next cycle.

Obviously means must be provided to restore mechanical energy to the spring motor 100 of the drive mechanism 18. The system which is provided rewinds the spring motor at any time the motor energy decreases to a given lower limit, whether this be during or at the conclusion of the spring motor run in order that the spring motor will be constantly prepared to deliver its energy.

An electric rewind motor 359 is provided to deliver energy to the spring motor 100 through a worm gear 360 and its shaft 361 through which the rewind motor output is coupled to the spring motor barrel 161. A peripheral gear 363 which is connected to the spring barrel 161 meshes with the worm gear 360 to effect a rotation of the spring barrel 161 with respect to the spring output shaft 136 to wind up the spring motor in a manner well known in the art. As previously described, the barrel gear 159 rotates with the spring barrel, as does the meshing intermediate gear 157 and an integral axial sleeve 366 attached to the gear 157 and concentric with the sensing shaft 155. Thus it is seen that the unwinding or the delivery of spring motor energy results in rotation of the sensing shaft 155 in one direction, while winding of the spring motor is translated into opposite rotation of the axial sleeve 366. The drawings of FIGURES 6, 9, and 15 best illustrate the mechanism and circuitry which responds to these counter-rotating systems to start and stop the spring rewind motor.

The angular position of a cam 375, which is carried by the sensing shaft 155, is made to control the position of a normally closed cam-operated "stop" switch 377 and a normally open cam-operated "start" switch 379 which control the operation of a rewind relay 381, controlling the rewind motor 359. The switch operating schedules are set forth in FIGURE 15 next to the diagrams of the switch to which it applies, it being understood that the activation, or ACT, portion of the schedules is that number of degrees of cam travel which changes the switch position opposite to that in which they are illustrated. For purposes of explanation it will be assumed that the low limit of spring motor energy is defined as zero degrees on the cam schedules while the upper limit of spring energy, or fully wound, is defined as 180°.

When the rewind motor cam 375 reaches zero degrees the "start" cam switch 379 closes and voltage will be applied therethrough to the coil of the rewind relay 381, actuating the relay 381 and applying voltage through the normally open contact 386 of the relay to the input of the rewind motor 359. As will be explained, the counter-rotation of the rewind system rotates the rewind cam 375 in a direction opposite to that found during the delivery of spring energy. As the rewind cam begins opposite rotation the start switch 379 again opens, but the rewind relay remains energized by the application of voltage thereto through the relay's own holding contact 376 and the contacts of the normally closed stop switch 377. At the time the rewind cam 375 reaches 180° the stop switch 377 is opened, removing the voltage from the holding contact 376 and de-energizing the rewind relay 381 thus disconnecting the operating voltage from the rewind motor 359. Once rewound the spring motor is available for the continued delivery of initial energy to the chart transport system. The rewind cam 375 is concentrically mounted on the sensing shaft 155 by a hub member 384 which is freely rotatable on the reduced diameter end portion of the shaft 155. The cam is rotated through a connection to a planetary gear 386 which is disposed radially from the axis of the sensing shaft 155 and is arranged to mesh with a pinion gear 388 mounted on and for rotation with the sensing shaft 155. The planetary gear 386 is supported by a pair of side bearing plates 390 and 391 which bear a spindle pin 393 on which the planetary gear 386 is mounted for rotation. Both of the said bearing plates are carried by the shaft 155 and are freely rotatable thereon. A screw fastener 395 provides the connection between the rewind cam 375 and the bearing plates 390 and 391 which support the planetary gear 386. In the same plane as and surrounding the planetary gear 386 is a ring gear 398 having teeth on its inner periphery which engage the teeth of the planetary gear 386. The ring 398 is attached to a parallel and coaxial spur gear 401 by means of pins 403 and spacers 404, which ring gear is also carried by the sensing shaft 155 which rotates independently of the concentric ring gear mounting sleeve 406. The rewind ring and spur gears 398 and 401 are driven by a meshing pinion gear 407 co-axial with and laterally disposed from a larger idler gear 409 which is engaged with and turned by a second idler gear 411 deriving its rotation from its engagement with a rewind output gear 415 which, with a hub 416, is rotatably mounted on the forward end of the intermediate gear sleeve 366 which slides over the spur gear sleeve 406. The rewind assembly is held in place and supported by the sensing shaft 155 and a cooperating stud bushing 410 which is press fitted into an aperture 412 in the front mounting plate 140.

As the spring output shaft 136 turns to deliver spring energy, the sensing shaft is likewise turned through its interconnecting gears 135 and 120. Tracing the operation further it is noted that the rotation of the sensing shaft pinion gear 388 results in the movement of the planetary gear 386 in an arc about the axis of the sensing shaft 155. As the planetary gear describes its arc the attached rewind cam is also rotated about its center. When the cam 375 acts to close the start switch 379 and the rewind motor is started the spring barrel 161 and its associated gears, the barrel gear 159 and the intermediate gear 157, rotate so as to cause the spring motor to wind up and the intermediate gear sleeve 366 and the rewind output gear 415 fixed thereto by its hub 416 ultimately causes rotation of the ring gear 398 through the train movement of the idler gears 411 and 409 and the pinion gear 407. The direction of rotation of the ring gear is counter to the direction of arc travel made by the planetary gear 386 when driven by the sensing shaft pinion gear 388 and hence the ring gear rotation moves the planetary gear in a reverse arc, thus turning the rewind cam 375 in a direction opposite the "spring unwind" rotation. When the rewind cam 375 is sufficiently counter-rotated by the winding of the spring motor the stop switch 377 will open, turning off the rewind motor and stopping further counter-rotation of the cam 375. As long as the rewind motor is capable of supplying an amount of power at least equal to the maximum delivery power requirement of the spring motor, conditions will be satisfied to fulfill the objective of the invention relating to the constant availability of stored mechanical energy.

Having thus described the several useful and novel features of the oscillographic fault recorder of the present invention in connection with the accompanying drawings, it will be seen that the many worthwhile objectives for which it was designed have been achieved. Although but one of the several possible embodiments of the invention has been ilustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. In recording apparatus:
 a normally inoperative radiation source having a voltage input;
 an image display medium against which the radiation is directed;
 means directing the radiation from the said source to the image display medium, including:
  movable deflector means responsive in motion to the time variations of the phenomenon to be recorded and positioned with respect to said directed radiation so as to influence the direction of said radiations as a function of said time variations; and means responsive to the initiation of the phenomenon to be recorded to cause radiations to be emitted from said source, including:
   an abnormally high voltage source,
   a normal voltage source,
   a feedback loop having an output and a radiation sensitive device in a position to receive radiation from the radiation source, and
   switching means alternatively interconnecting said voltage sources with the radiation source and responsive to the output of the feedback loop to make a change from one of said voltage sources to the other.

2. In recording apparatus:
 a normally inoperative radiation source having a voltage input;
 an image display medium against which the radiation is directed;
 means directing the radiation from the said source to the image display medium, including:
  movable deflector means responsive in motion to the time variations of the phenomenon to be recorded and positioned with respect to said directed radiation so as to influence the direction of said radiations as a function of said time variations;
  a source of electrical voltage;
  first switching means responsive to the phenomenon to be recorded to apply voltage from the voltage source to the radiation source input;
  a feedback loop having a voltage output and including:
   radiation sensitive means having a voltage output and positioned to receive radiation from the radiation source; and
  second switching means responsive to a given voltage output level of the said feedback loop for reducing the voltage applied to the input of the radiation source.

3. In recording apparatus:
a first radiation source;
an auxiliary radiation source;
an image display medium against which radiation from said radiation sources is directed;
means including at least one deflector directing radiation from the first source to the image display medium, said deflector being mounted for pivotal movement about an axis perpendicular to the plane of the incident and reflected radiation; and
means responsive to the failure of the first radiation source for causing radiation from the auxiliary source to be directed against the image display medium, including:
electro-mechanical means operably connected to the said deflector for pivoting the deflector about its mounting axis.

4. In recording apparatus:
a first radiation source;
an auxiliary radiation source;
said sources each having voltage inputs;
an image display medium against which radiation from said radiation sources is directed;
means including at least one deflector directing radiation from the first source to the image display medium, said deflector being mounted for pivotal movement about an axis perpendicular to the plane of the incident and reflected radiation; and
means responsive to the failure of the first source for causing radiation from the auxiliary source to be directed against the image display medium, including:
electro-mechanical means operably connected to the said deflector for pivoting the deflector about its mounting axis; and
switching means interconnecting the voltage source and the said voltage input of the auxiliary radiation source.

5. Oscillographic recording apparatus, comprising:
a normally inoperative radiation source having a voltage input;
a record carrier;
record carrier transport means, including:

drive means engaging the record carrier and adapted to move the record carrier;
normally inoperative motor means coupled to the drive means;
means operably connected to the radiation source and the motor means and responsive to the initiation of the phenomenon to be recorded for producing an output from the radiation source and starting said motor means;
means directing the radiation from the said source to the record carrier, including:
a movable deflector means responsive in motion to the time variations of the phenomenon to be recorded and positioned with respect to said directed radiation so as to influence the direction of said radiations as a function of the said time variations;
an endless recording loop;
an oscillator having an output and frequency determining means responsive to the time variations of the phenomena to be recorded;
recording means electrically connected to the said oscillator output and operatively engagable with the endless recording loop to make a record thereon;
playback means positioned diametrically across the loop from the recording means and positioned with respect to the said loop so as to pick up the intelligence recorded thereon;
a frequency discriminator having a voltage output and being electrically connected to the playback means; and
means electrically connecting the output of the frequency discriminator to the movable deflector means.

References Cited by the Examiner

UNITED STATES PATENTS

| | | | |
|---|---|---|---|
| 2,078,257 | 4/37 | Liner | 318—136 |
| 2,478,346 | 8/49 | Van Doorn | 318—136 |
| 2,915,360 | 12/59 | Clark et al. | 346—136 |
| 3,045,241 | 7/62 | Savit | 346—109 |
| 3,046,553 | 7/62 | Hawkins et al. | 346—33 |
| 3,064,260 | 11/62 | Heiland | 346—109 |

LEYLAND M. MARTIN, *Primary Examiner.*

LEO SMILOW, *Examiner.*